United States Patent [19]

Baba

[11] Patent Number: 4,729,090
[45] Date of Patent: Mar. 1, 1988

[54] DMA SYSTEM EMPLOYING PLURAL BUS REQUEST AND GRANT SIGNALS FOR IMPROVING BUS DATA TRANSFER SPEED

[75] Inventor: Eiji Baba, Tokyo, Japan
[73] Assignee: NEC Corporation, Tokyo, Japan
[21] Appl. No.: 630,787
[22] Filed: Jul. 13, 1984

[30] Foreign Application Priority Data

Jul. 13, 1983 [JP] Japan .................................. 58-127209

[51] Int. Cl.⁴ .............................................. G06F 13/28
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,067,059 | 1/1978 | Derchak | 364/200 |
| 4,215,400 | 7/1980 | Denko | 364/200 |
| 4,462,084 | 7/1984 | Greenwood | 364/900 |
| 4,475,155 | 10/1984 | Oishi | 364/200 |
| 4,493,036 | 1/1985 | Boundreau | 364/200 |

Primary Examiner—Archie E. Williams, Jr.
Assistant Examiner—Emily Y. Chan
Attorney, Agent, or Firm—Sughrue, Mion, Zinn, Macpeak, and Seas

[57] ABSTRACT

A data processing apparatus employing a DMA system has a newly added circuit having a register in addition to the normal combination of a host processor, a memory and a DMA controller. The added circuit is provided between the host processor and the DMA controller. The host processor produces a setting signal by itself for setting a bus request signal into the register of the added circuit. The added circuit applies the bus request signal set in the register to the host processor without an access from the DMA controller. The host processor receives the bus request signal and sends a bus usage grant signal to the added circuit when the host processor does not need to use a bus or after a processing using the bus has been completed, and electrically cuts off itself from the bus. The DMA controller requests a bus usage to the added circuit when a DMA transmission is required. At this timing, since the bus is already in an idle state, a permission signal to permit a bus usage is immediately returned to the DMA controller. Therefore, a high-speed DMA transmission can be performed. Particularly, a quick response between the host processor and the DMA controller can be achieved by means of the added circuit.

3 Claims, 3 Drawing Figures

DMA SYSTEM EMPLOYING PLURAL BUS REQUEST AND GRANT SIGNALS FOR IMPROVING BUS DATA TRANSFER SPEED

BACKGROUND OF THE INVENTION

1. Field of the Invention

The present invention relates to a data processing apparatus employing the direct memory access (DMA) procedure, and more particularly to a data processing apparatus wherein a host processor, a memory and a peripheral controller transfer data from one to another through a common data bus.

2. Description of the Prior Art

A DMA system is the system in which data can be directly transmitted between the peripheral controller and the memory without intervention of the host processor. Such data transmission is called the DMA transmission and is widely used in a conventional data processing apparatus wherein the host processor, the memory and the peripheral controller are coupled to each other by a common data bus. The DMA transmission must be performed in a period when the common bus is in an idle state, that is, when the host processor does not use the common bus.

In general, to give the right of bus usage to the peripheral controller, a DMA controller is employed in the above described data processing apparatus. The DMA controller is inserted between the host processor and the peripheral controller, and sends a DMA request signal to the host processor according to an access request from the peripheral controller. In response to the reception of the request signal, the host processor checks whether it is itself utilizing the bus utilizing at this time. This checking operation is in general executed by software, for instance a DMA interruption program. As the result, if the host processor does not need to use the bus, the bus usage right is granted at this time to the peripheral controller. On the other hand, if the host processor is using the bus or needs to use the bus at this time, the bus usage right is not granted to the peripheral controller until its host processor has finished the use of the bus. The DMA controller grants the bus usage right to the peripheral controller according to the result of the aforementioned checking operation by the host processor.

However, the check operation requires a long period of time since the DMA interruption program is executed by software. Particularly, the host processor starts the checking operation after receiving the DMA request signal from the DMA controller, and therefore a quick response for the DMA request can not be obtained in the conventional data processing apparatus.

Further, in the case that a display controller, a disk controller, etc. are employed as a peripheral controller, a high-speed DMA transmission is particularly required because a large number of data bits must be manipulated. Since such peripheral controllers need a large number of DMA transmissions, a quick response between the host processor and the DMA controller is necessary. However, as described above, the conventional data processing apparatus spends a significant time in the checking operation, and therefore it is unsuitable for the high-speed DMA transmission.

SUMMARY OF THE INVENTION

It is therefore an object of the present invention to provide a data processing apparatus in which it is possible to execute a high-speed DMA transmission without the software checking operation.

It is another object of the present invention to provide a data processing apparatus having a novel circuit inserted between a host processor and a DMA controller to provide a quick response for a DMA request.

It is still another object of the present invention to provide a data processing apparatus in which arbitration of a common bus is improved and is speeded up.

According to the present invention, there is provided a data processing apparatus which includes a memory, a peripheral controller for controlling a data transmission between the memory and a peripheral unit such as a display unit, a disk unit, a printing unit or a keyboard unit. The apparatus further includes a host processor for executing a program according to instructions, and a common bus for coupling together the memory, the peripheral controller and the host processor. A bus controller coupled to the peripheral controller designates the common bus usage to the peripheral controller. The the host processor sets a flag register when the host processor does not need to use the common bus or after the host processor has terminated a data transmission using the common bus. The host processor receives an output of the flag register and electrically cuts itself off from the common bus when the flag register is being set. That is, the host processor generates a set signal to set the flag register by itself without receiving a bus usage request signal (e.g. DMA request signal) from the bus controller (e.g. DMA controller), and generates a bus usage grant signal (an acknowledgment signal) in response to the output of the flag register. The bus usage grant signal may be generated when the host processor electrically cuts itself off from the common bus or after the common bus has been electrically separated from the host processor. The bus controller sends a bus request signal, in response to an access from the peripheral controller, to a detector means which sends a permission signal to the bus controller in response to the reception of the bus request signal when the bus usage grant signal is being received therein from the host processor. The bus controller designates the common bus usage to a peripheral controller. As the result the peripheral controller executes a data transmission to or from the memory by using the common bus without intervention of the host processor. At this time, the host processor may also execute a program which does not need to use the common bus.

According to the present invention, the host processor does not generate the bus usage grant signal in response to a bus request signal from the bus controller, but generates it by itself when the host processor does not need to use the common bus or after a data transmission processing using the common bus has been terminated. Therefore, the checking operation required in the conventional data processing apparatus is unnecessary in the present invention. The bus controller can immediately receive the permission signal from the detector after outputting the bus request signal in response to the access from the peripheral controller. Consequently, a quick response between the host processor and the bus controller can be accomplished, and a high-speed data transmission can be executed in the DMA system.

Further, if the host processor electrically cuts itself off from the common bus according to the flat register set signal or the output of the flag register, the output of the flag register may be used as the bus usage grant signal. In this case there is an advantage that a signal line to transfer the bus usage grant signal from the host processor can be omitted, and therefore circuit layout is simplified.

When the present invention is applied to a data processing apparatus employing a DMA system, the preferred apparatus comprises a peripheral control circuit for controlling a high-speed peripheral unit, a first memory capable of storing and reading out data and which memorizes data transmitted to and from the peripheral control circuit. The apparatus further comprises/implemented in a DMA controlling circuit constituted by an LSI for controlling the transmission of data between the peripheral control circuit and the first memory. A microprocessor controls the peripheral control circuit, the first memory, and the DMA controlling circuit. An additional circuit provided with a DMA request flag is set by a DMA request flag setting signal generated by the microprocessor and used as a DMA request signal. The DMA request flag is reset by a DMA completion signal issued from the peripheral control circuit or the DMA controlling circuit at the time when the DMA transmission of necessary data is completed. A second memory stores instructions for designating a processing routine and for designating generation of the DMA request flag setting signal when the microprocessor gives a bus usage right to the peripheral control circuit or the DMA controlling circuit.

DETAILED DESCRIPTION OF THE PREFERRED EMBODIMENT

Figure 1:
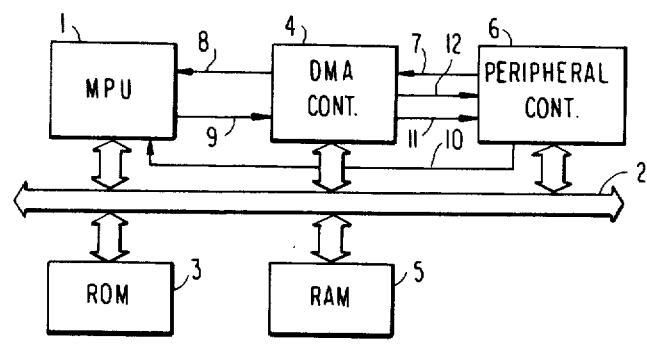
FIG. 1 is a block diagram of a conventional data processing apparatus employing a DMA system.

FIG. 1 is a block diagram showing the conventional DMA data transmission system.

The data processing apparatus comprises a microprocessor unit (MPU) 1, a program memory (ROM) 3, a DMA control unit 4, a read/write memory (RAM) 5 and a peripheral control unit 6. These units and memories are all connected to a common bus 2. The MPU 1 fetches instructions according to a program from a program ROM 3 via the bus 2. Set commands from the DMA control unit 4 and the peripheral control unit 6 allow the MPU 1 data transmission between the peripheral control unit 6 and the RAM 5. Thereafter when the peripheral control unit 6 requires a DMA transmission, a request is made to the DMA control unit 4 using a data transmission request signal 7. Immediately after receiving this signal, the DMA controlling unit 4 requests the MPU 1 for the use of the bus 2, by means of a bus request signal 8. At this time, if the MPU 1 is executing a program and is using the bus 2, the MPU 1 cannot release the bus immediately. Consequently, upon terminating the processing, the MPU 1 releases the bus 2 and sends a bus usage grant signal (acknowledgment signal) 9 to the DMA control unit 4. The DMA control unit 4 sends a start signal 12 to the peripheral control unit 6 for designating a DMA transmission, whereby the DMA control unit 4 performs data transmission between the peripheral control unit 6 and the RAM 5 through the bus 2. Upon completion of data transmission, the DMA control unit 4 issues a transmission completion signal 11 to the peripheral control unit 6 to inform the completion of DMA transmission and then disenables the bus request signal 8. The DMA control unit 6 informs the MPU 1 of the completion of data transmission by means of a termination signal 10.

As described above, the conventional data processing apparatus in FIG. 1 requires a long period of time until the DMA control unit 4 sends the DMA start signal 13 to the peripheral control unit 6 after the peripheral control unit 6 requests the DMA transmission. Particularly, a very long period of time is necessary from requesting a bus usage by means of the bus request signal 8 till reception of the bus usage grant signal 9. This is because the microprocessor 1 produces the bus usage grant signal 9 in response to the bus request signal 8 from the DMA control unit 4. Further the microprocessor 1 must execute checking operations to check whether the bus request signal 8 is received or not and to check whether the bus should be released or not after the check of the bus request signal 8. These checking operations are performed according to a software routine. Therefore, the conventional data processing apparatus renders difficult the performing of a high-speed DMA processing.

Figure 2:
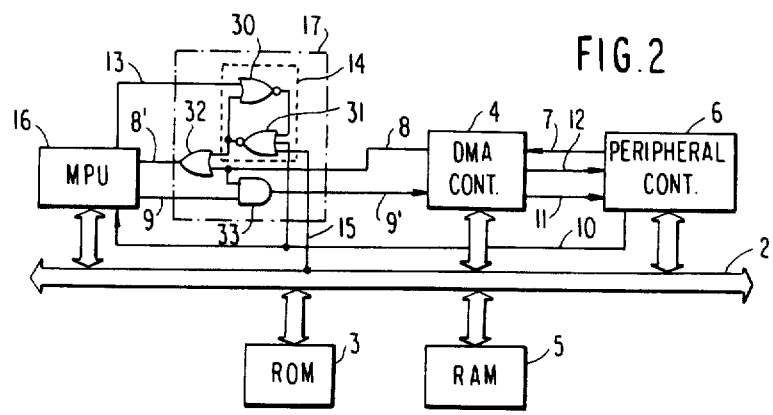
FIG. 2 is a block diagram of an embodiment of a data processing apparatus according to the present invention.

Next, a preferred embodiment of the present invention will be described with reference to FIG. 2 illustrating a block diagram of an improved data processing apparatus. The DMA control unit 4, the peripheral control unit 6, the program ROM 3 and the read/write memory (RAM) 5 are the same units as the units in FIG. 1, respectively, and are connected to the common data bus 2. A microprocessor 16 has the same function as that of the microprocessor 1 in FIG. 1 but has the additional function of generating a signal 13 described in detail hereinafter. Of course, the microprocessor 13 is connected to the common bus 2 to perform a data transmission to and from the memories 3 and 5. Further, the apparatus has a newly added circuit 17 to perform a quick response between the microprocessor 16 (host processor) and the DMA control unit 4. The added circuit 17 is provided with a DMA request flag register 14 which is set by a DMA request flag setting signal 13 from the microprocessor 16, and is reset by a transmission termination signal 10 issued by the peripheral control circuit 6 at the time when the transmission of necessary data is terminated. The ROM 3 stores instructions for a microprocessor execution program and for the generation of a flag setting signal 13 immediately after the microprocessor 17 issues a command to the peripheral control circuit 6 and the DMA control unit 4. In brief, according to the invention, the added circuit 17 is provided between the microprocessor 16 and the DMA control unit 4, and the microprocessor 16 is capable of setting the DMA request flag register 14. The flag register 14 has two NOR gates 30 and 31 which are connected in the shape of a closed loop. Further, the added circuit 17 has an OR gate 32 and an AND gate 33. The OR gate 32 outputs a signal 8' according to the output of the NOR gate 31 and the bus request signal 8 from the DMA control unit 4. The AND gate 33 outputs a bus usage grant signal 9' according to the signal 9 from the microprocessor 16 and the bus request signal 8 from the DMA control unit 4.

Next, a description is provided of the operation of this embodiment.

After sending a command to the DMA control unit 4 and the control circuit 6, the MPU (microprocessor unit) 16 sets the DMA request flat 14 by means of the flag setting signal 13. That is, the MPU 16 receives instructions from the ROM 3 through the bus 2 and decodes them. According to the result of decoding, the MPU 16 executes a given program and sends commands to the DMA control unit 4. These commands may be, for example, a command designating a DMA start address of the RAM 5, a command designating the number of data to be transferred between the peripheral control unit 6 and the RAM 5, or a command designating a DMA transmission timing rate, etc. The MPU 16 also produces the flag setting signal 13.

The flag register 14 has been reset in an initial state by an initializing signal 15 sent through the bus 2, and is set by the flag setting signal 13. According to this setting signal 13, the NOR gate 31 of the flag register 14 outputs an active signal. At this time, the active signal is applied to the MPU 16 as the bus request signal 8' through the OR gate 32. The MPU 16 receives the bus request signal 8', and produces the bus usage grant signal 9 at an arbitrary time when the MPU 16 does not need to use the bus 2 or after a processing sequence using the bus 2 has been completed. Further, the MPU 16 electrically decouples or cuts itself off from the bus 2 when the bus usage grant signal 9 is applied to the AND gate 33 of the added circuit 7. On this condition, the bus 2 enters an idle state.

In this state, when the peripheral control circuit 6 requests data transmission to the DMA control unit 4 by means of a data transmission request signal 7, the DMA control unit 4 outputs the bus request signal 8. However, the bus usage grant signal 9 has been already returned since the MPU 1 has already released the bus at this time. Therefore, the grant signal 9' can be returned immediately to the DMA control unit 4. As the result, the DMA controlling unit 4 carries out data transmission between the controlling circuit 6 and the RAM 5 without delay. Upon completion of the DMA data transmission, a termination signal 10 is outputted from the peripheral control circuit 6 to the flag register 14 the MPU 16. Therefore, the DMA request flag 14 is reset and the bus request signal 8' to the MPU 16 is cut off, thereby allowing the operation of the MPU 1 to resume.

Thus, the use of the added circuit 17 according to the invention makes it possible to eliminate wasteful time accompanied by the changeover of the bus, which has been a problem in the conventional arrangement, and makes it possible to cope with high-speed data transmission.

Figure 3:
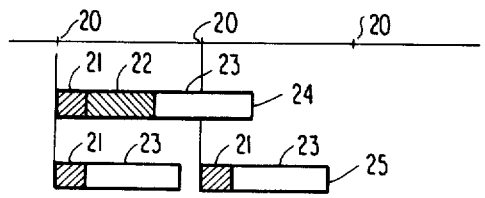
FIG. 3 is a timing diagram of a DMA transmission according to the invention of FIG. 2 and the conventional data transmission system of FIG. 1.

FIG. 3 shows the time chart of transmission according to the invention and the conventional transmission system. In FIG. 3, a data transmission request 20 is generated at fixed intervals of time. In contrast, according to the conventional system, the actual data transmission 23 is effected after a time lag 21 in the DMA control unit and a time delay 22 due to the changeover of the bus from the MPU. Thus, the data transmission time 24 during one cycle exceeds the time for the data transmission request 20. When the transmission system according to the invention is used, however, the time delay 22 due to the changeover of the bus can be eliminated, with the result that one data transmission process 25 can be completed before the next data transmission request 20 is made. In addition, it becomes possible to effect the conventional type of transmission unless the DMA request flag 14 is set.

As described in detail above, according to the invention, immediately after the microprocessor unit 16 issues a command to the DMA control circuit 4 and/or the peripheral control unit 6, the microprocessor unit 16 by itself sets a flag requesting a cut-off of the bus 2, whereby it is possible for the DMA control unit 4 to use the bus 2 immediately. As a result, the waiting time for the DMA transmission in making a request can be eliminated, thereby making it possible to effect data transmission at high speed.

In FIG. 2, it must be noted that the OR gate 32 is provided in order to be able to directly send the bus request signal 8 to the MPU 16 from the DMA control unit 4. Therefore, the OR gate 32 may be omitted in the case that applying the bus request signal 8 from the DMA control unit 4 to the MPU 16 is not necessary. Further, the bus usage grant signal 13 or the output of the flag register 14 may be used as the grant signal 9. Moreover, at least one element or all elements included in the added circuit 17 may be integrated in the MPU semiconductor chip or the DMA control control unit chip.

What is claimed is:

1. A data processing apparatus comprising:
   a microprocessor for executing a program;
   a program memory storing instructions, one of which is a DMA transfer instruction;
   a peripheral control unit controlling a peripheral device;
   a data memory;
   a DMA control unit generating a first bus request signal to perform a DMA transfer between said peripheral control unit and said data memory;
   a bus commonly coupled to said microprocessor, said program memory, said peripheral control unit, said data memory, and said DMA control unit; and
   a bus control unit coupled to said microprocessor and said DMA control unit, said bus control unit containing a flag register coupled to said microprocessor and applying a second bus request signal to said microprocessor in response to a flag register setting signal applied to said flag register from said microprocessor when said DMA transfer instruction is executed by said microprocessor, said microprocessor generating a first bus grant signal regardless of a state of said first bus request signal in response to said second bus request signal, and a gate circuit having a first input coupled to said microprocessor for receiving said first bus grant signal, a second input coupled to said DMA control unit for receiving said first bus request signal, and an output coupled to said DMA control unit for applying a second bus grant signal to said DMA control unit when both said first bus request signal and said second bus grant signal are received.

2. A data processing apparatus comprising:
   a host processor;
   a memory;
   a peripheral control unit;
   a DMA controller generating a first bus request signal and controlling a DMA transfer between said memory and said peripheral control unit;
   a common bus coupled to said host processor, said memory, said peripheral control unit, and said DMA controller is common;
   a control circuit coupled to said host processor and said DMA controller and having a flag register generating a second bus request signal in response to a flag register setting signal sent from said host processor, and a gate circuit coupled to said host processor and said DMA controller, said flag register being coupled to said host processor and applying said second bus request signal regardless of a state of said first bus request signal in response to said flag register setting signal sent from said host processor, said host processor applying a first bus grant signal to said gate circuit in response to said second bus request signal, said gate circuit generating a second bus grant signal when said first bus request signal from said DMA controller is applied thereto after said first bus grant signal has been received at said gate circuit, said DMA controller performing a DMA transfer between said memory and said peripheral control unit in response to said second bus grant signal generated from said gate circuit.

3. The data processing apparatus as claimed in claim 2, wherein said flag register of said control circuit is coupled to said peripheral control unit, which generates a DMA termination signal when the DMA transfer is terminated, and stops application of said second bus request signal to said host processor in response to said DMA termination signal.

* * * * *

UNITED STATES PATENT AND TRADEMARK OFFICE
CERTIFICATE OF CORRECTION

PATENT NO. : 4,729,090

DATED : March 1, 1988

INVENTOR(S) : Baba

It is certified that error appears in the above-identified patent and that said Letters Patent is hereby corrected as shown below:

COLUMN 2, LINE 67   Delete "flat", insert --flag--;

COLUMN 6, LINE 21   After "control" delete "control";

Signed and Sealed this

Sixth Day of September, 1988

Attest:

DONALD J. QUIGG

Attesting Officer

Commissioner of Patents and Trademarks